United States Patent [19]

Menge

[11] Patent Number: 4,880,027
[45] Date of Patent: Nov. 14, 1989

[54] METHOD OF AND APPARATUS FOR REGULATING THE FLOW OF AT LEAST ONE GAS STREAM

[76] Inventor: Heinrich Menge, Eissendorfer Pferdeweg 45, D-2100 Hamburg, Fed. Rep. of Germany

[21] Appl. No.: 134,292

[22] Filed: Dec. 17, 1987

[30] Foreign Application Priority Data

Dec. 17, 1986 [DE] Fed. Rep. of Germany ....... 3643043

[51] Int. Cl.$^4$ .............................................. E03D 9/05
[52] U.S. Cl. .................................. 137/247.25; 4/351; 4/213
[58] Field of Search ...................... 137/247.11, 247.25; 4/209 R, 213, 214, 215, 350, 351

[56] References Cited

U.S. PATENT DOCUMENTS

| | | | |
|---|---|---|---|
| 2,297,935 | 10/1942 | Baither | 4/213 |
| 2,575,778 | 11/1951 | Wilson | 4/213 |
| 2,603,797 | 7/1952 | Baither | 4/215 X |
| 2,985,890 | 5/1961 | Baither | 4/213 |
| 3,548,424 | 12/1970 | Ducey et al. | 4/215 |
| 3,579,650 | 5/1971 | Sloan | 4/215 X |
| 3,930,506 | 2/1976 | Pearson | 4/213 |
| 4,193,967 | 3/1980 | Black | 137/247.25 |
| 4,222,129 | 9/1980 | Baker | 4/215 X |
| 4,249,559 | 2/1981 | George | 137/247.25 X |

Primary Examiner—John Rivell
Attorney, Agent, or Firm—Peter K. Kontler

[57] ABSTRACT

The evacuation of foul smelling gases from the interior of a toilet bowl is effected by a fan which is driven by an electric motor and conveys the gases from the bowl through a control chamber in the flushing tank and into an evacuating conduit which is connected to the drain pipe. The motor is started in response to closing of a master switch which is distinct and preferably remote from an actuating knob which must be lifted or otherwise moved in order to enable a body of flushing liquid to flow from the tank into the bowl. A siphon is provided to permit liquid to flow from the interior of the control chamber into the interior of the flushing tank in response to rising pressure in the control chamber. Such pressure, which rises in response to starting of the motor, causes a lowering of the liquid level in a portion of the control chamber and a rise of the liquid level in another portion of the control chamber so as to establish in the siphon a continuous column of liquid which flows by gravity from the control chamber into the flushing tank so as not to waste the liquid which normally seals the inlet for gaseous fluid from the outlet for gaseous fluid in the control chamber.

64 Claims, 4 Drawing Sheets

METHOD OF AND APPARATUS FOR REGULATING THE FLOW OF AT LEAST ONE GAS STREAM

CROSS-REFERENCE TO RELATED CASE

The apparatus of the present invention is similar to those disclosed in the commonly owned copending patent application Ser. No. 901,261 filed July 25, 1986 for "Apparatus for regulating the flow of at least one gas stream".

BACKGROUND OF THE INVENTION

The invention relates to improvements in methods of and in apparatus for regulating the flow of one or more gas streams, especially for regulating the flow of malodorous air from so-called self-ventilating toilets. More particularly, the invention relates to improvements in methods of and in apparatus for regulating the flow of gases through a control chamber or vessel wherein a gas-admitting inlet is normally sealed from a gas-discharging outlet by a body of sealing liquid (normally water).

In heretofore known apparatus (such as self-ventilating toilets), the path for the flow of malodorous gases from the inlet to the outlet of the control chamber is established in response to actuation of a knob or another manually operable handgrip member so as to lower the level of the supply of sealing liquid in the chamber beneath that which is necessary to establish a liquid seal between the gas-admitting inlet and the gas-discharging outlet of the control chamber. Once the path for the outflow of air from the interior of the toilet bowl is established, the bowl is used and its contents are flushed down the drain pipe. During such interval of time, malodorous gases are caused to flow through the control chamber and into a gas-discharging conduit which is connected to the control chamber and evacuates gases from the room in which the bowl is installed. The handgrip member (such as the aforementioned knob or a lever) is similar to the handgrip member which must be actuated in order to flush the contents of the bowl down the drain pipe so that the user of a toilet employing such self-ventilating bowl is likely to confuse the actuating means for ventilation with the actuating means for flushing. Thus, flushing can take place prior to or without the establishment of a path for evacuation of malodorous air from the bowl. This is aggravating when the self-ventilating toilet is installed in a passenger plane, in a terminal, in a restaurant, in a school or in any other establishment wherein one and the same toilet is likely to be used at frequent intervals.

As a rule, presently known self-ventilating toilets are equipped with mechanical means for effecting or initiating the evacuation of sealing liquid from the control chamber, and such mechanical means employ large numbers of moving parts which are subject to extensive wear leading to short useful life of the apparatus and/or to frequent malfunctions. Moreover, and as mentioned above, the actuating members for such apparatus are similar to and are often placed adjacent the actuating members which must be manipulated in order to flush the contents of toilet bowls down the drain. This is confusing to a person who is not familiar with the manipulation of a self-ventilating toilet.

OBJECTS AND SUMMARY OF THE INVENTION

An object of the invention is to provide a novel and improved method of regulating the flow of one or more gas streams in such a way that improper manipulation of the controls is less likely than in accordance with heretofore known and proposed methods.

Another object of the invention is to provide a method which can be utilized with advantage in connection with the evacuation of malodorous gases from the bowls of self-ventilating toilets.

A further object of the invention is to provide a method which ensures that the entire liquid seal which is employed to normally prevent the flow of one or more gas streams from the inlet to the outlet of a control chamber or vessel can be put to additional use prior to discarding.

An additional object of the invention is to provide a novel and improved apparatus for the practice of the above outlined method and to construct and assemble the apparatus in such a way that it can be readily installed in or adjacent the flushing tank of a self-ventilating toilet.

A further object of the invention is to provide the apparatus with novel and improved means for establishing, when necessary, one or more paths for the flow of one or more gas streams from the inlet to the outlet of the control chamber or vessel.

Still another object of the invention is to provide the apparatus with novel and improved means for effecting rapid and predictable evacuation of sealing liquid when it becomes necessary to establish one or more paths for the flow of one or more gas streams to a selected area, e.g., into the drain pipe of a self-ventilating toilet.

Another object of the invention is to provide the apparatus with novel and improved means for admitting the sealing liquid into the flushing tank of a self-ventilating toilet.

An additional object of the invention is to provide the apparatus with novel and improved actuating means which is less likely to be confused with the actuating means for the flushing tank than in heretofore known apparatus.

A further object of the invention is to provide an apparatus which comprises a minimal number of moving parts so that its useful life is longer than that of heretofore known apparatus.

Still another object of the invention is to provide an electrically operated apparatus for evacuation of malodorous air from the bowl of a self-ventilating toilet.

A further object of the invention is to provide an apparatus which can be installed in or combined with existing types of toilet bowls with a minimum of alterations and/or adjustments.

Another object of the invention is to provide the apparatus with novel and improved safety features which prevent excessive accumulations of sealing and/or flushing liquids and the resulting waste.

A further object of the invention is to provide a self-ventilating toilet which embodies the above outlined apparatus.

Another object of the invention is to provide a toilet flushing tank which embodies the above outlined apparatus.

An additional object of the invention is to provide the apparatus with novel and improved means for automatically initiating the admission of a fresh supply of sealing liquid after each flushing of the contents of a toilet bowl.

One feature of the present invention resides in the provision of a method of regulating the flow of at least one stream of gas (such as foul smelling gas issuing from a toilet bowl when the toilet is in use) through a control chamber or vessel which has an inlet for admission of the at least one stream and a stream-discharging outlet. The method comprises the steps of admitting into the chamber or vessel a body of sealing liquid which fills or can fill the chamber to a predetermined level such that the admitted liquid seals the inlet from the outlet, and applying to the body of liquid a pressure to alter at least a portion of the predetermined level and to thereby establish communication between the inlet and the outlet. The pressure applying step can include admitting into the chamber or vessel a pressurized gas by way of the inlet, particularly by raising the pressure of the at least one stream of gas.

The method can further comprise the steps of dividing the interior of the chamber into a first compartment which is in communication with the inlet and a second compartment which is in communication with the outlet, and establishing between the first and second compartments a passage which is located below the predetermined level. The pressure applying step of such method can include lowering the level of sealing liquid in the first compartment below the predetermined level so that the at least one stream of gas can flow from the first compartment into the second compartment by way of the passage.

The method can further comprise the steps of combining the chamber or vessel with a container (e.g., by confining the chamber in the flushing tank of a toilet), and establishing a hydrostatic connection between the second compartment and the interior of the container in response to the aforementioned lowering step and the resulting raising of the liquid level in the second compartment so that the sealing liquid flows from the second compartment into the interior of the container.

Another feature of the invention resides in the provision of an apparatus for regulating the flow of at least one stream of gas, particularly the flow of foul smelling gas which develops in a toilet bowl when the toilet is in use. The apparatus comprises a control chamber or vessel having a gas-admitting inlet and a gas-discharging outlet, means for supplying into the chamber a body of sealing liquid (normally water) so that the liquid fills the chamber at most up to a predetermined level below the inlet and the outlet, means for establishing at least one passage for the flow of gas from the inlet to the outlet in response to lowering of the liquid level in a portion at least of the chamber, and means for raising the pressure in said chamber in the region above the predetermined level so as to render the passage accessible to the at least one gas stream by lowering the liquid level in the aforementioned portion of the chamber. The apparatus further comprises means for evacuating sealing liquid from the chamber in response to raising of pressure in the chamber in the region above the predetermined level. The evacuating means has an intake which is located below the predetermined level when the pressure raising means is idle and which is located below the outlet of the chamber.

The pressure raising means can include a gas-admitting conduit which is connected with the inlet of the chamber.

The aforementioned passage establishing means can comprise a partition which divides the interior of the chamber into a first compartment in communication with the inlet and a second compartment in communication with the outlet of the chamber. The two compartments communicate with each other by way of the at least one passage in response to lowering of the liquid level in the first compartment, and the pressure raising means of such apparatus includes means for raising the pressure in the first compartment in the region above the predetermined level so that the liquid in the second compartment rises and can be caused to leave the chamber by way of the evacuating means. A portion at least of the passage is disposed at a level above the intake of the evacuating means. The evacuating means can comprise a siphon including a substantially upright pipe and a preferably tubular envelope surrounding the pipe and having a closed end above the pipe. The envelope and the pipe define a space (such as an annular space) in communication with the second compartment. The chamber has a bottom wall and the envelope preferably includes a portion (e.g., a plurality of legs) resting on the bottom wall of the chamber and defining at least one path for the flow of sealing liquid between the second compartment and the space. The pipe has an open upper end at level which coincides with or is located above the predetermined level. The pipe further includes an open lower end which serves to admit sealing liquid into the interior of a container (such as the flushing tank for a toilet bowl) which is associated with the chamber (e.g., the chamber can be installed in the upper portion of the container) and serves to confine a supply of liquid. The apparatus which embodies such container further comprises means for maintaining the supply of liquid in the container at or below a preselected level and below the lower end of the pipe. The open lower end of the pipe is located below the intake for admission of sealing liquid into the space between the pipe and the envelope.

The aforementioned gas-admitting conduit can be installed in such a way that it is connected to the inlet of the control chamber with its upper or lower end. Analogously, the apparatus can comprise a gas-discharging conduit whose upper or lower end is connected with the outlet of the control chamber.

The pressure raising means can include the gas-admitting conduit, a pressure generating device (e.g., a blower or fan) in the gas-admitting conduit, and a motor (preferably an electric a-c or d-c motor) for the pressure generating device. Circuit means is provided to supply energy to the motor, and such circuit means can include an interrupter switch, particularly a normally closed switch which can be opened by a float in the control chamber when the supply of sealing liquid in the chamber reaches the predetermined level.

The circuit means for the electric motor further comprises a master switch which is normally open, and means for driving the motor (and hence the pressure generating device) at a plurality of different speeds in response to closing of the master switch (preferably in such a way that a pressure surge develops immediately after the master switch is closed and the pressure at the inlet of the control chamber thereupon decreases). The motor can include two windings. The circuit means can further include a source of electrical energy (e.g., a means for connecting the motor to a household outlet or one or more rechargeable batteries).

The apparatus can further comprise means for conveying sealing fluid from the chamber into the container independently of the aforementioned evacuating means, and such conveying means has an open end at the predetermined level of liquid in the chamber. In accordance with a presently preferred embodiment, the conveying means includes an upright or substantially upright overflow pipe having an open upper end at the predetermined level in the control chamber and an open lower end which is confined in the container or is positioned with reference to the container in such a way that the sealing liquid which is conveyed from the chamber by way of the overflow pipe enters the container. The overflow pipe can comprise means for varying the distance between its open ends. For example, the pipe can include a first portion which defines the open upper end and a second portion which defines the open lower end. One of these portions is telescoped into the other portion, and the second portion is movable up and down relative to the first portion between a plurality of different positions in each of which the lower end is located at a different distance from the upper end. The first portion can include an internally threaded nut, and the second portion can be provided with external threads in mesh with the internal threads of the nut. Sealing means can be interposed between the first and second portions of the overflow pipe, and means can be provided for deforming the sealing means into adequate sealing engagement with the two portions of the overflow pipe in response to application of the nut.

A source of sealing liquid (e.g., a water tap) is preferably connected with the aforementioned liquid supplying means. The supplying means can include a conduit which contains a normally open valve so as to permit sealing liquid to flow into the control chamber. A float in the container is provided to close the valve in the conduit of the liquid supplying means when the supply of sealing liquid in the container reaches a preselected level. Such sealing liquid enters the container by way of the aforementioned evacuating and/or conveying means.

The chamber can have a substantially circular or a substantially polygonal cross-sectional outline (in a vertical plane). The bottom wall of such chamber can be provided with a recess for the intake of the aforediscussed evacuating means, and such recess is preferably filled with liquid at all times to prevent the gas from penetrating into the container whence it could escape into the surrounding atmosphere.

The master switch in the aforementioned circuit means can be installed in or on or close to the seat of a toilet bowl. Alternatively, the master switch can be installed close to or on the lower portion of the toilet bowl. Still further, the master switch can be installed in or on the floor which constitutes a support for the toilet bowl.

The aforementioned overflow pipe between the chamber and the container can be surrounded by a tubular envelope which is analogous to the tubular envelope of the evacuating means. Such envelope defines a path for the flow of sealing liquid from the interior of the chamber into the overflow pipe when the sealing liquid in the chamber rises to the predetermined level.

The aforementioned gas-admitting conduit can connect the inlet of the control chamber or vessel with the toilet bowl, and the aforementioned gas-discharging conduit can connect the outlet of the chamber with a drain pipe which serves to evacuate the contents of the toilet bowl in response to flushing, i.e., in response to admission of liquid from the container into the bowl. As mentioned above, the container can constitute a flushing tank, and at least a portion of the control chamber or vessel can be installed in the interior of the flushing tank.

A second or main overflow pipe can be provided to evacuate liquid from the container when the supply of liquid in the container rises to the preselected level. The main overflow pipe has an inlet at the preselected level, and it can discharge liquid into the aforementioned drain pipe. The lower end of each overflow pipe can extend into a relatively small liquid-filled vessel (e.g., in the form of an open-top cup) which serves to prevent escape of foul odors from the chamber into the container and from the container into the surrounding atmosphere. The overflow pipe between the chamber and the container can be connected with the gas-discharging conduit which is connected to the outlet of the control chamber. Alternatively, the overflow pipe between the chamber and the container can be connected with the conduit which admits gas into the chamber. The upright pipe of the evacuating means can be integrated into the overflow pipe between the chamber and the container.

The circuit means of the aforementioned motor for the pressure generating device can be opened by an additional switch which is operated by a float in the container in such a way that the switch opens when the supply of liquid in the container rises to the preselected level. This ensures that the motor is arrested when the supply of liquid in the container is replenished to the preselected level. In order to flush the toilet bowl, the user first closes the master switch which is in parallel with the other switch or switches of the circuit means so that the path for the flow of gas is established from the inlet to the outlet of the control chamber, and the user thereupon flushes the toilet bowl by opening a path for the flow of liquid from the container into the bowl by way of a suitable conduit while the motor is on to evacuate foul smelling air from the interior of the bowl by way of the aforementioned gas-admitting and gas-discharging conduits and the drain pipe.

A relatively small liquid reservoir can be provided in the control chamber beneath the predetermined level so that it is normally filled with sealing liquid and can discharge a predetermined quantity of sealing liquid into the interior of the chamber upon completed evacuation of liquid from the chamber by the evacuating means. The reservoir can include a vessel having an inlet opening and an outlet opening beneath the inlet opening. The cross-sectional area of the inlet opening preferably exceeds that of the outlet opening.

As mentioned above, the overflow pipe between the chamber and the container can be integrated into the upright pipe of the evacuating means. Such overflow pipe can have a substantially S-shaped or Z-shaped configuration and an open end which constitutes the intake of the evacuating means and is located beneath the predetermined level. A downstream portion of the S-shaped or Z-shaped pipe is preferably located at or close to the predetermined level, and the intake of such pipe can be provided in the bottom wall of the control chamber.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
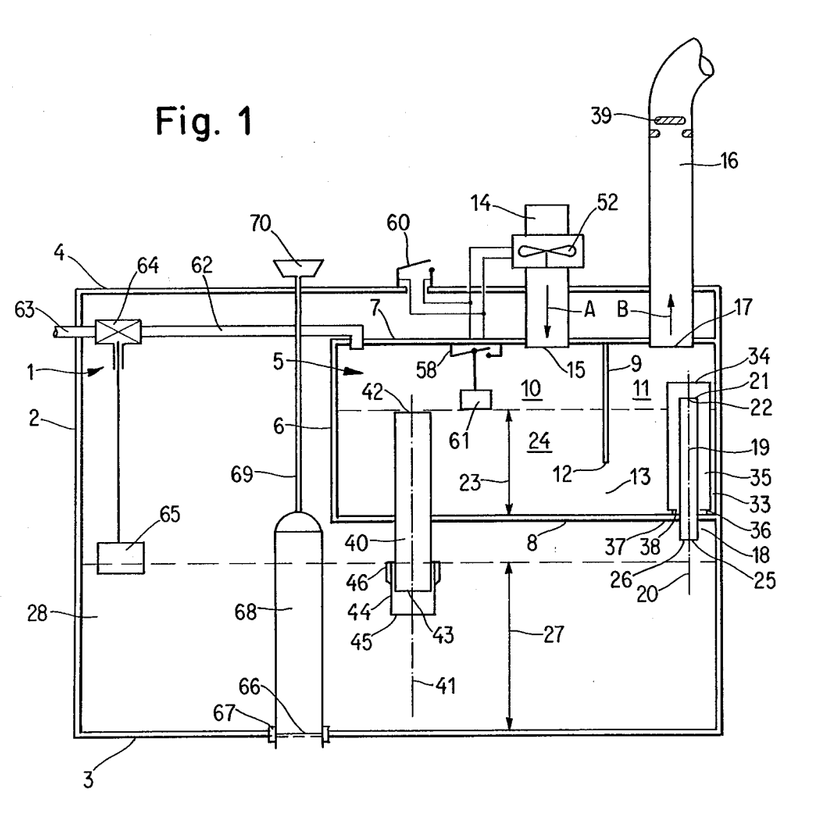
FIG. 1 is a schematic vertical sectional view of a container in the form of a flushing tank and of a control chamber which forms part of one embodiment of the improved gas flow regulating apparatus and is installed in the interior of the tank.

Referring first to FIG. 1, there is shown an apparatus which serves to regulate the flow of a gas stream in directions indicated by arrows A and B, namely from a first gas-admitting conduit 14, through the interior of a control chamber 5 and into a gas-evacuating second conduit 16. The control chamber 5 is a relatively small vessel which is installed in the interior of a larger container 1 constituting the flushing tank (see FIG. 2) for a toilet bowl 74. The container or flushing tank 1 has four upright sidewalls 2, a horizontal bottom wall 3 and a horizontal top wall or cover 4. The control chamber 5 in the interior of the container 1 has sidewalls 6, a bottom wall 8, and a cover or top wall 7. The top wall 7 has an inlet 15 which is connected with the lower end of the conduit 14, and an outlet 17 which is connected with the lower end of the conduit 16.

The top wall or cover 7 of the control chamber 5 is connected to or made integral with a downwardly extending partition 9 the lower end portion 12 of which is spaced apart from the bottom wall 8 of the control chamber and which divides the interior of the control chamber into a larger first compartment 10 and a smaller second compartment 11. The two compartments can communicate with each other by way of a passage 13 which extends between the lower end portion 12 of the partition 9 and the upper side of the bottom wall 8. The compartments 10 and 11 are normally sealed from each other by a body of sealing liquid 24 which can fill the interior of the control chamber 5 up to a predetermined maximum permissible level 23. Such level is located above the lower end portion 12 of the partition 9. The compartment 10 communicates with the conduit 14 by way of the inlet 15, and the compartment 11 communicates with the conduit 16 by way of the outlet 17 in the top wall or cover 7 of the control chamber 5. The conduit 14 serves to admit air and/or foul smelling gases from the interior of the toilet bowl 76 into the space above the level 23 of sealing liquid 24 in the control chamber 5, and the conduit 16 serves to evacuate such foul smelling gases from the control chamber 5, for example, into a drain pipe 99 which is shown in FIG. 2 and serves to evacuate the contents of the toilet bowl 74 in response to flushing, namely in response to admission of a large stream of liquid 28 from the interior of the container or flushing tank 1 into the bowl 74.

The improved regulating apparatus further comprises means 18 for evacuating sealing liquid 24 from the control chamber 5 into the interior of the container 1 during establishment of a path (via passage 13) between the inlet 15 and outlet 17 in the top wall or cover 7 of the control chamber 5. The evacuating means 18 includes a siphon having an upright pipe 19 the vertical axis of which is shown at 20 by a phantom line, and a tubular envelope 33 which surrounds the major part of the pipe 19 and defines therewith an annular space 35 communicating with the compartment 11 of the control chamber 5 by way of an intake 36 at the lower end of the envelope 33. The upper end 21 of the pipe 19 defines an opening 22 which can admit sealing liquid 24 from the compartment 11 into the pipe 19 when the pressure in the compartment 10 above the predetermined level 23 is raised in accordance with a feature of the present invention. The sealing liquid 24 then enters the intake 36 at the lower end of the envelope 33 and flows through the annular space 35 into the opening 22 in the upper end 21 of the pipe to be admitted into the container 1 by way of an opening 26 in the open lower end 25 of the pipe 19. The upper end of the envelope 33 is closed at 34 at a level above the opening 22 in the upper end 21 of the pipe 19, and the lower end portion of the envelope 33 includes a plurality of circumferentially spaced-apart legs 37 which define between themselves gaps 38 establishing a path for the flow of sealing liquid 24 from the compartment 11, through the intake 36 and into the annular space 35. The intake 36 is located at a level between the open upper and lower ends 21, 25 of the pipe 19, the upper end 21 of the pipe is located at a level above the predetermined maximum permissible level 23 of sealing liquid 24 in the control chamber 5, and the lower end 25 of the pipe 19 is disposed at a level above the maximum permissible level 27 of the supply of sealing or flushing liquid 28 in the interior of the container 1.

In accordance with a modification which is not shown in the drawing, the lower end 25 of the pipe 19 can extend close to the bottom wall 3 of the container 1.

Figure 2:
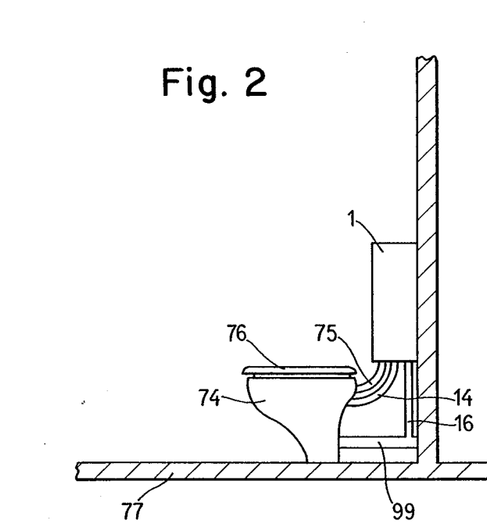
FIG. 2 is a side elevational view of the flushing tank and of the associated toilet bowl, further showing conduits which connect the flushing tank with the bowl, the bowl with the inlet of the control chamber, and the outlet of the control chamber with the drain pipe.

The gas evacuating or discharging conduit 16 contains a suitable check valve 39 which prevents return flow of foul smelling gases from the drain pipe 99 of FIG. 2 into the upper portion of the compartment 11 in the control chamber 5.

It will be noted that the cross-sectional area of the compartment 10 (in a horizontal plane) greatly exceeds the cross-sectional area of the compartment 11. This is desirable and advantageous because abrupt and unexpected pressure surges in the space above the body of sealing liquid 24 in the control chamber 5 are less likely to influence the operation of the regulating apparatus. Fluctuations of pressure are particularly likely to develop in the conduit 14. Any relatively minor surges of pressure in the conduit 16 are not very likely to appreciably alter the level of the top surface of the body of liquid 24 in the compartment 11.

The regulating apparatus further comprises means for conveying sealing liquid 24 from the control chamber 5 into the container 1 independently of the evacuating means 18. Such conveying means comprises a composite overflow pipe having an upper portion 40 with an open upper end 42 at the level 23 and an open lower end 43 in the interior of the container 1. The lower portion 44 of the overflow pipe constitutes a means for varying or altering the distance between the open end 42 and the open lower end 45 of the lower portion 44. As shown in greater detail in FIG. 7, the upper portion 40 carries a rotary nut 50 with internal threads 51 mating with external threads 47 at the upper end 46 of the lower portion 44. A sealing element in the form of a ring 48 is interposed between the portions 40 and 44 and undergoes deformation under the action of a partly or fully conical deforming ring 49 which can be moved downwardly in response to rotation of the nut 50. By rotating the nut 50, an operator can change the level of the lower end 45 of the lower portion 44 and hence the distance between the lower end 45 and the upper end 42 of the upper portion 40 of the composite overflow pipe. The portions 40, 44 of the overflow pipe are substantially vertical (note the vertical axis 41 which is indicated in FIG. 1 by a phantom line). The upper end 42 of the upper portion 40 of the composite overflow pipe 40, 44 is located at the level 23 so that it receives sealing liquid 24 which tends to rise above such level. The nut 50 cooperates with the lower portion 44 of the overflow pipe to allow for highly accurate adjustments of the distance between the upper end 42 and the lower end 45.

Figure 7:
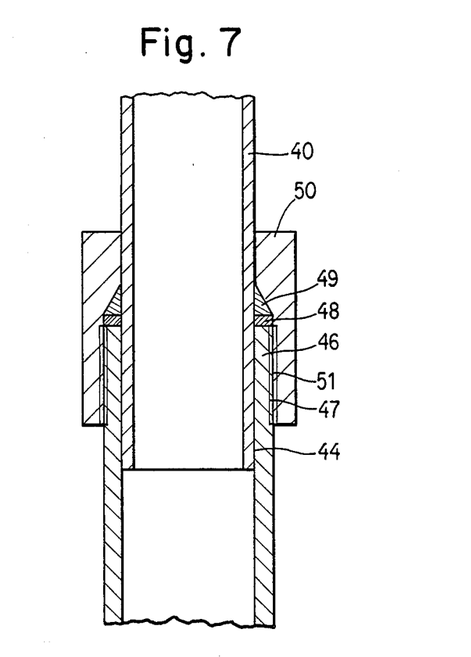
FIG. 7 is an enlarged fragmentary axial sectional view of the liquid conveying means which can be employed in accordance with the invention to direct overflowing sealing liquid from the interior of the control chamber into the interior of the flushing tank.

The illustrated deforming ring 49 can be replaced with other means which is capable of adequately stressing the sealing ring 48 so as to ensure the establishment of a fluidtight seal between the portions 40 and 44 of the composite overflow pipe. For example, the deforming ring 49 can be replaced with a truly cylindrical deforming ring.

In the embodiment which is shown in FIG. 7, the upper portion 40 of the overflow pipe is telescoped into the lower portion 44. Of course, it is also possible to reverse the connection so that the upper end 46 of the lower portion 44 extends into the lower end of the upper portion 40. The lower end of the portion 40 then carries an external thread mating with the internal threads of a nut on the lower portion 44.

The level of the lower end 45 of the lower portion 44 of the composite overflow pipe 40, 44 is preferably selected in such a way that the lower end 45 is immersed in the body of sealing or flushing liquid 28 in the container 1 when the liquid 28 fills the container 1 all the way to the maximum permissible level 27. However, the lower end 45 becomes exposed in response to partial or complete evacuation of the body of liquid 28 from the interior of the container 1. The extent to which the lower end 45 penetrates into the body of liquid 28 is such as to ensure that compressed gas above the level 23 in the compartment 10 is incapable of penetrating through the overflow pipe 40, 44 and into the interior of the container 1 but is compelled to depress the supply of liquid in the compartment 10 so that it can flow beneath the lower end portion 12 of the partition 9 (namely through the passage 13) and into the upper portion of the compartment 11, i.e., it can enter the conduit 16 by way of the outlet 17 in the top wall 7 of the control chamber 5. On the other hand, the level of the lower end 45 of the lower portion 44 of the composite overflow pipe 40, 44 should not be too close to the bottom wall 3 of the container 1 in order to prevent an improper operation of the regulating apparatus by causing a delayed establishment of elevated pressure in the upper part of the compartment 10. If the pressure rise in the compartment 10 is unduly delayed, namely if it is established after the liquid 28 has been evacuated from the container 1, and if the composite overflow pipe 40, 44 is too long, the container 1 is likely to be filled with sealing or flushing liquid 28 by way of the evacuating means 18 while the control chamber 5 remains empty until after the supply 28 of liquid in the container 1 again rises to the maximum permissible level 27.

Figure 5:
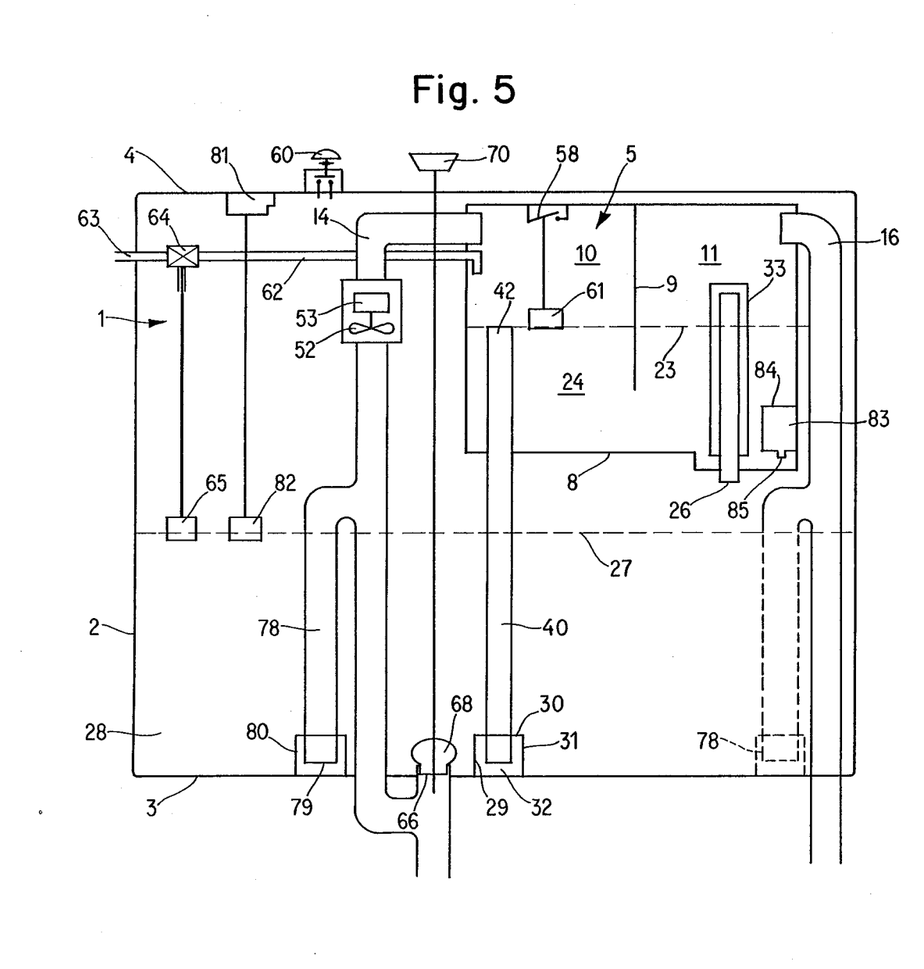
FIG. 5 is a schematic vertical sectional view of a third flushing tank and of a further apparatus.

FIG. 5 shows that the lower end portion of the overflow pipe 40 (which constitutes a single piece of tubular metallic or plastic stock) can extend into a liquid-filled vessel 29 in the form of a cup mounted on or integral with the bottom wall 3 of the container 1. The supply of liquid in the vessel or cup 29 prevents the penetration of foul odors from the upper portion of the compartment 10 in the control chamber 5 into the interior of the container 1 whence such odors could escape into the surrounding atmosphere. The top 30 of the vessel or cup 29 is open, and the bottom wall of such cup is spaced apart from the open lower end of the overflow pipe 40 of FIG. 5 so that the liquid 24 which overflows the level 23 in the control chamber 5 of FIG. 5 can descend into the body of liquid 28 in the lower portion of the container 1 if the admission of sealing liquid into the control chamber 5 is not terminated in immediate response to refilling of such chamber up to the maximum permissible level 23. The cylindrical or tubular wall 31 of the vessel or cup 29 is spaced apart from the peripheral surface of the adjacent lower end portion of the overflow pipe 40 of FIG. 5 so as to ensure that the liquid which flows from the control chamber 5 has room to enter the interior of the container 1.

In order to prevent improper operation of the control apparatus which embodies the structure of FIG. 5, the circuit 56 of a motor 53 (see FIG. 8) for a pressure generating device 52 in the form of a blower or fan in the gas-admitting conduit 14 contains a switch 81 which is normally closed but can be opened by a float 82 in the container 1 as soon as the supply of liquid 28 in the container rises to the predetermined maximum permissible level 27.

FIG. 5 further shows a main overflow pipe 78 which serves to permit evacuation of excess liquid 28 from the interior of the container 1. In other words, the overflow pipe 78 prevents the liquid 28 from rising above the preselected level 27. The lower end 79 of the main overflow pipe 78 is open and extends into a cup or vessel 80 serving the same purpose as the aforediscussed cup or vessel 29, namely to prevent penetration of foul odors into the interior of the container 1 above the level 27. The cup or vessel 80 can be mounted on or can form an integral part of the bottom wall 3 of the container 1. The upper end portion of the main overflow pipe 78 is communicatively connected with the conduit 14 which admits the stream of gas into the compartment 10 of the control chamber 5 and contains the aforementioned pressure generating device 52 driven by the motor 53 in response to closing of a master switch 60.

As shown in FIG. 5 by broken lines, it is also possible to connect the main overflow pipe 78 with the conduit 16 which evacuates malodorous gases from the upper portion of the compartment 11 of the control chamber 5. In FIG. 5, the compartments 10 and 11 are similar in size and shape. The main overflow pipe 78 will be connected with the conduit 16 if the latter is connected with a drain pipe, such as the drain pipe 99 shown in FIG. 2. This renders it possible to evacuate foul smelling gases from the toilet which employs the bowl 74 without any discomfort to the user or users of the toilet.

Figure 8:
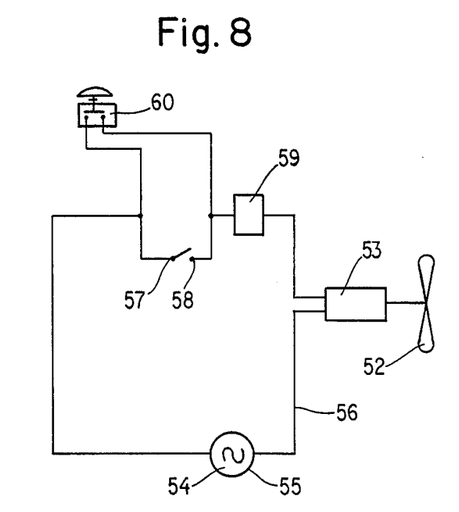
FIG. 8 is a diagram of the electric circuit means for the motor which drives the pressure generating device in the gas-admitting conduit of the improved apparatus.

The motor 53 for the blower or fan 52 or any other suitable rotary pressure generating device is an electric motor which, as shown in FIG. 8, is connected in a circuit 56 including energy supplying means 54 in the form of a source 55 of a-c current. Furthermore, the circuit 56 includes the aforementioned master switch 60 which remains closed only as long as it is depressed by the user of the toilet, a control unit 59 which can regulate the rate of current supply to the motor 53 in such a way that the rate is high in immediate response to closing of the master switch 60 and thereupon decreases, and a float-operated interrupter device 57 here shown as including a simple electric switch 58. The float which an open the switch 58 when the level of liquid 24 in the control chamber 5 rises to 23 is shown at 61 in FIG. 1. The illustrated motor 53 is an a-c motor. However, it is equally possible to employ a d-c motor and to replace the source 55 with a source of a-c current, for example, with a set of rechargeable batteries (not shown).

If the motor 53 is a simple twin-winding motor, the control unit 59 can be replaced with a much simpler control unit which merely constitutes a switchover device to ensure that one or both windings of the motor receive electric current.

Referring again to FIG. 1, the control chamber 5 can receive liquid 24 by way of a supply pipe or conduit 62 which is connected to a source 63 of sealing liquid, normally water. The source 63 can constitute a connection to a water tap. The supply conduit 62 contains a valve 64 which can be closed by a float 65 in the interior of the container 1. The arrangement is such that the float 65 rises with the rising body of liquid 28 in the container 1 to close the valve 64 when the supply of liquid 28 reaches the maximum permissible level 27. As explained above, the tank or container 1 can receive liquid 28 by way of the evacuating means 18 and/or by way of the composite overflow pipe 40, 44.

FIG. 1 further shows a plug 68 which normally seals a flushing opening 66 in the bottom wall 3 of the container 1. A seal 67 is provided to prevent leakage of liquid 28 from the container 1 when the plug 68 is maintained in the lower end position of FIG. 1 by gravity or under the action of a suitable spring, not shown. A linkage 69 connects the plug 68 with an actuating knob 70 at a level above the top wall or cover 4 of the container 1. It will be noted that the actuating knob 70 is quite different from the master switch 60 so that the user of the toilet cannot readily confuse the parts 60 and 70. Such user must learn to first actuate or close the master switch 60 in order to establish a connection between the inlet 15 and outlet 17 of the control chamber 5 prior to using the toilet and prior to subsequent lifting of the knob 70 so as to permit the body of sealing and flushing liquid 28 to escape from the container 1 and to flow into the bowl 74 by way of a conduit or flushing line 75 shown in FIG. 2.

Figure 3:
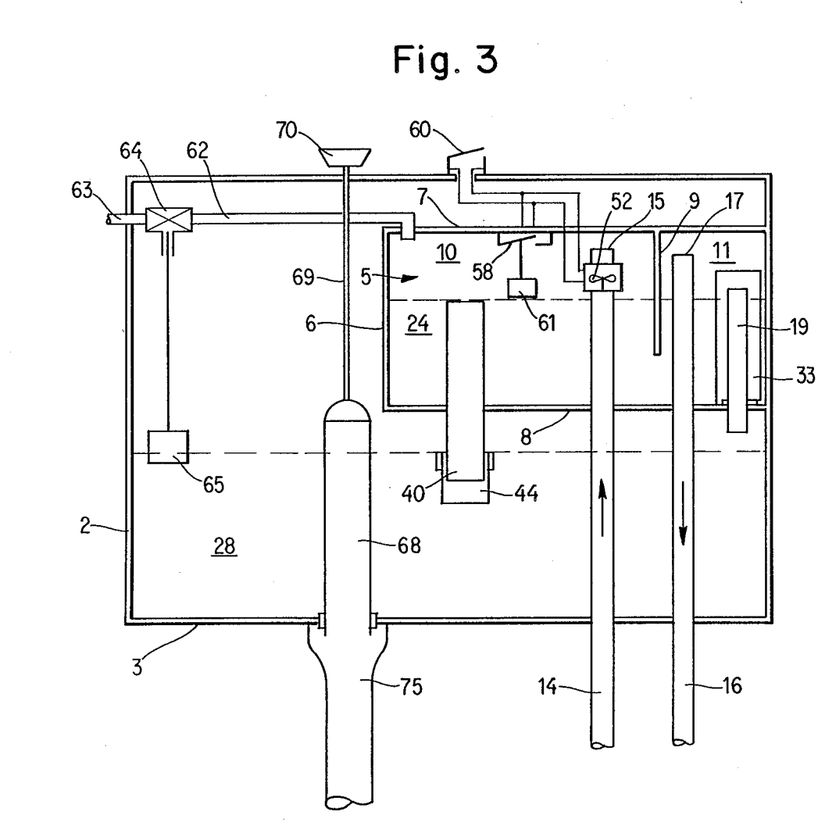
FIG. 3 is a schematic vertical sectional view similar to that of FIG. 1 but showing a somewhat modified flushing tank and a modified apparatus for regulating the flow of gas streamsin accordance with the invention.
Figure 4:
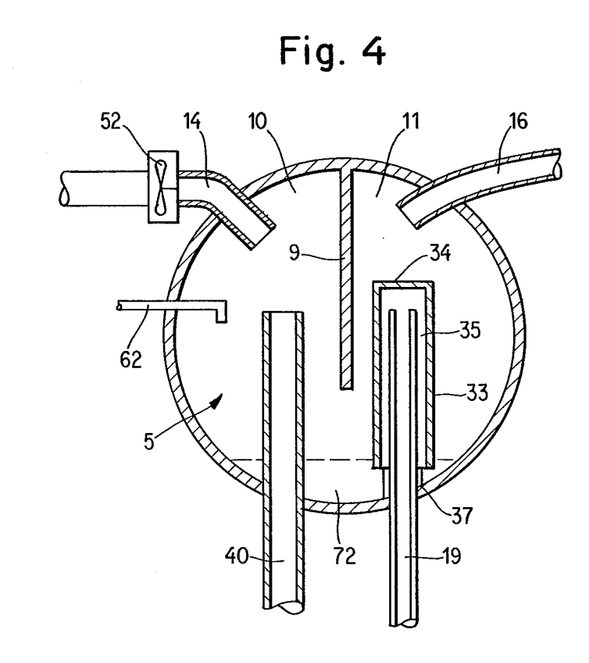
FIG. 4 is a transverse vertical sectional view of a control chamber which has a substantially circular cross-sectional outline.
Figure 6:
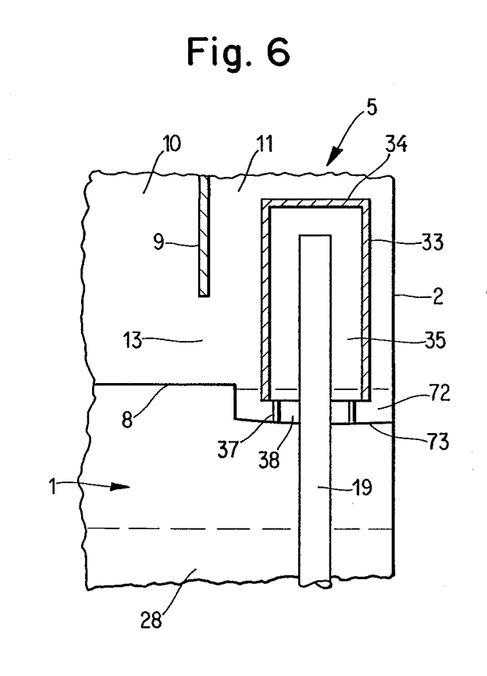
FIG. 6 is an enlarged view of a detail in the apparatus of FIG. 6, further showing a reservoir for a supply of sealing liquid above a recess in the bottom wall of the control chamber.
Figure 9:
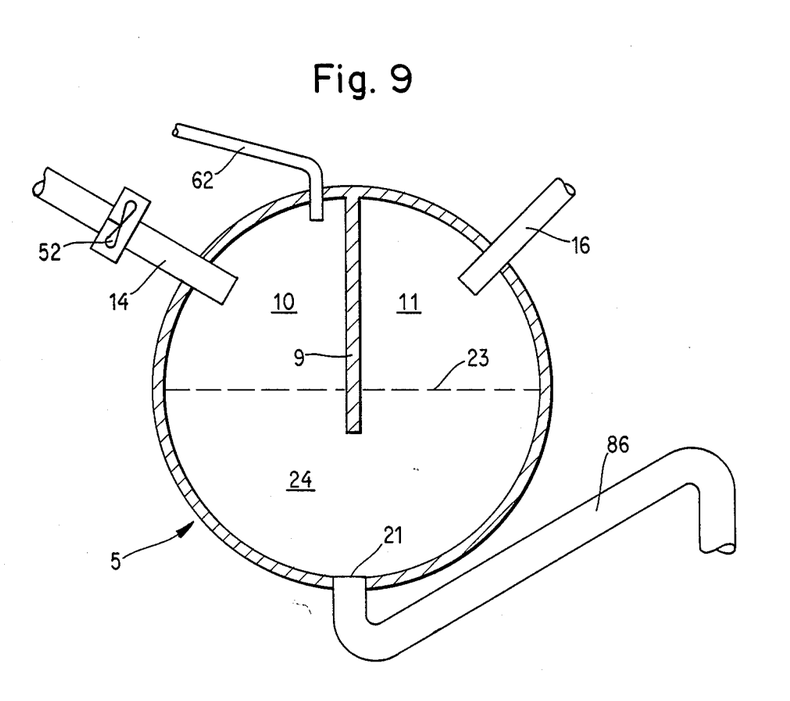
FIG. 9 is a transverse vertical sectional view of the control chamber in an apparatus which constitutes a modification of the apparatus shown in FIG. 4.

As shown particularly in FIG. 6, the control chamber 5 can have a polygonal (preferably a rectangular or square) cross-sectional outline in a vertical plane. Alternatively, and as shown in FIGS. 4 and 9, the cross-sectional outline of the control chamber 5 in a vertical plane can resemble a circle. The arrangement may be such that the lowermost portion of the control chamber 5 invariably contains a minimum quantity 72 of sealing liquid 24 in order to prevent penetration of foul odors from the interior of the compartment 11 into the interior of the container 1. As can be seen in FIG. 6, the flat bottom wall 8 of the control chamber 5 can be provided with a recess 73 for the minimum quantity 72 of sealing liquid 24 and the intake of the tubular envelope 33 extends into such quantity 72 so as to establish a liquid seal between the interior of the chamber 5 and the interior of the container 1 in the region of the evacuating means 18. FIGS. 1, 4 and 9 show that the orientation of conduits 14 and 16 is selected with a view to ensure that the lower end portions of such conduits respectively communicate with the inlet 15 and outlet 17 of the control chamber 5. However, and as shown in FIG. 3, it is equally possible to install the conduits 14 and 16 in such a way that their upper ends respectively communicate with or define the inlet 15 and outlet 17 of the control chamber 5.

The flushing opening 66 in the bottom wall 3 of the container 1 shown in FIG. 1 is connected to the flushing line or conduit 75 leading into the toilet bowl 74 of FIG. 2. FIG. 1 shows that the master switch 60 is mounted on the top wall or cover 4 of the container 1. However, it is equally possible to mount such master switch on or close to the seat 76 of the bowl 74 of FIG. 2, to mount the master switch 60 close to or on the lower portion of the bowl 74, or to mount the master switch 60 on or in the floor 77 which constitutes a support for the toilet bowl 74 of FIG. 2. It is desirable to configurate and mount the master switch 60 in such a way that it is unlikely to be confused with the actuating knob 70 which latter must be lifted or otherwise moved by the user of the toilet in order to permit the body of flushing or sealing liquid 28 to leave the lower portion of the container 1 and to descend into the bowl 74 in order to flush the contents of the bowl into the drain pipe 99.

Referring again to FIG. 5, there is shown a relatively small reservoir or vessel 83 which is installed in the control chamber 5 below the maximum permissible level 23 of liquid 24 and has a relatively large inlet opening 84 at its upper end and relatively small outlet opening 85 at its lower end. The outlet opening 85 serves to admit the minimum quantity 72 of sealing liquid into the recessed portion 73 of the bottom wall 8 so as to establish a liquid seal between the intake 36 of the tubular envelope 33 of the evacuating means 18 and the interior of the container 1. The reservoir or vessel 83 can constitute a cup which is open at its top (as at 84) and has a relatively small outlet opening 85 in its bottom wall so as to make sure that the recessed portion 73 of the bottom wall 8 will be filled within a prescribed interval of time, namely while the upper level of the supply of liquid 24 in the control chamber 5 descends from the level of the inlet opening 84 toward the upper level of the recessed portion 73 in the bottom wall 8 of the control chamber 5.

FIG. 9 shows a modification wherein the evacuating means and the means for conveying liquid from the control chamber 5 into the container 1 (not shown in FIG. 9) are assembled into a single overflow pipe 86 having a substantially S-shaped or Z-shaped outline. The open end 21 of the pipe 86 constitutes the aforementioned intake which is disposed in the lowermost portion (bottom wall) of the control chamber 5, and an intermediate portion of the overflow pipe 86 is located at a level close to the maximum permissible level 23 of the body of liquid 24 in the control chamber 5. Such design simplifies the construction of the entire regulating apparatus because the apparatus need not be provided with two discrete pipes, namely with a first pipe 19 for establishment of a hydrostatic connection between the control chamber 5 and the container 1 with and a second pipe corresponding to the overflow pipe 40, 44 of FIG. 1.

The operation of the regulating apparatus (which is assumed to be installed in the container or flushing tank 1 of FIG. 2) is as follows:

The person desiring to utilize the toilet first closes the master switch 60 so as to cause the control unit 59 in the circuit 56 of FIG. 8 to start the motor 53 whereby the propeller or propellers of the pressure generating device 52 are set in rotary motion. As mentioned above, the control unit 59 can be designed in such a way that the initial stage of operation of the motor 53 involves the generation of an elevated pressure which is communicated, by way of the conduit 14, to the space above the liquid level in the compartment 10 of the control chamber 5. The pressurized gas in the compartment 10 above the body of liquid 24 depresses such body and thereupon flows through the passage 13, through the body of liquid in the compartment 11 and toward and into the outlet 17 to be evacuated into the drain pipe 99 of FIG. 2 by way of the conduit 16. Depression of the body of liquid in the compartment 10 entails a rise of the body of liquid in the compartment 11 so that the liquid reaches the open upper end 21 of the pipe 19 and begins to flow through this pipe and into the interior of the container 1. As explained above, the intake 36 at the lower end of the tubular envelope 33 is in permanent communication with the compartment 11 so that the liquid which rises in the compartment 11 also rises in the annular space 35 between the pipe 19 and the envelope 33. The column of liquid which develops in the pipe 19 is hydrostatically connected with the body of liquid in the compartment 11 by way of the annular space 35 so that the liquid 24 continues to flow from the control chamber 5 into the container 1 because the evacuating means 19, 33 acts not unlike a siphon. When the liquid level in the control chamber 4 descends below the lower end portion 12 of the partition 9, the stream of gas which is admitted by the conduit 14 and enters the control chamber 5 by way of the inlet 15 is free to flow beneath the partition 9 and into the upper portion of the compartment 11 so that it can be evacuated by way of the conduit 16 the intake end of which is connected to the outlet 17 in the top wall 7 of the control chamber 5. As mentioned above, and as shown in FIG. 2, the discharge end of the conduit 16 is or can be connected with the drain pipe 99.

When the user of the toilet thereupon lifts the actuating knob 70, the plug 68 is lifted to expose the flushing opening 66 and to permit the body of liquid 28 to leave the container 1 and flow into the bowl 74 so that the contents of such bowl are flushed into and through the drain pipe 99. As the level of the body of liquid 28 in the container 1 descends, the float 65 opens the valve 64 in the supply conduit 62 so that this conduit admits a stream of sealing liquid (water) into the compartment 10 of the control chamber 5. The level of liquid 24 in the control chamber 5 rises, and such liquid overflows into the container 1 by way of the pipe 40, 44 as soon as it reaches the maximum permissible level 23. The position of the float 61 for the switch 58 is preferably selected in such a way that the switch 58 opens shortly before the body of liquid 24 reaches the level 23 so that the motor 53 is arrested shortly before the liquid 24 reaches the upper end of the overflow pipe 40, 44. The master switch 60 must be depressed only for a short interval of time because, as soon as the pressure generating device 52 begins to convey a stream of pressurized gas into the compartment 10, the level of liquid 24 in this compartment descends abruptly and the float 61 closes the switch 58 so that the master switch 60 can be released practically instantaneously as soon as the motor 53 is set in operation.

As the level of liquid 28 in the container 1 rises because the valve 64 is open, the float 65 also rises and ultimately closes the valve 64 as soon as the level of liquid 28 reaches that which is shown at 27. At such time, the control chamber 5 is filled to the level 23 and the container 1 is filled to the level 27.

If the control chamber 5 is designed in a manner as shown in FIGS. 4 and 6, an interruption of the water column in the interior of the pipe 19 of the evacuating means entails that some of the liquid flows from the annular space 35 back into the interior of the compartment 10 and/or 11 so that it forms the minimum quantity 72 which fills the lowermost portion of the circular control chamber 5 of FIG. 4 or the recessed portion 73 of the flat bottom wall 8 of the polygonal control chamber 5 of FIG. 6. Such minimum quantity 72 ensures that the compartment 10 and/or 11 is sealed from the interior of the container 1 to prevent penetration of foul smelling gases from the conduit 14 into the container. If necessary, the reservoir 83 assists the body of liquid which descends in the annular space 35 between the pipe 19 and envelope 33 to fill the recessed portion 73 and to form the aforementioned minimum quantity 72 of sealing liquid which prevents penetration of gases from the interior of the control chamber 5 into the interior of the container 1. Since the outlet opening 85 is smaller than the inlet opening 84 of the reservoir 83, the latter invariably ensures admission of the required minimum quantity 72 into the lower portion of the control chamber 5 of FIG. 4 or into the recessed portion 73 of the control chamber of FIGS. 5 and 6 after a break develops in the liquid column in the pipe 19.

The means for varying the effective length of the overflow pipe 40, 44 of FIG. 7 will be actuated upon installation of the regulating apparatus in the container 1. As mentioned above, the adjustment is such that the distance between the upper and lower ends of the composite overflow pipe 40, 44 suffices to ensure that the pressure which is established above the body of liquid 24 in the compartment 10 of the control chamber 5 in response to starting of the motor 53 is not reduced as a result of penetration of foul smelling gases through the overflow pipe 40, 44 into the interior of the container 1. Instead, the body of liquid 24 in the compartment 10 descends to the level of and below the lower end 12 of the partition 9 so as to be capable of flowing through the passage 13 and into the upper portion of the compartment 11. On the other hand, adjustment of the composite overflow pipe 40, 44 is to be carried out in such a way that, when the level of liquid 28 in the container 1 descends below that which is shown at 27 and below a minimum level, the pressure in the control chamber 5 cannot rise to a level at which the gas could flow from the conduit 14 into the conduit 16. Instead, the gas escapes into the container 1.

An important advantage of the improved method and apparatus is that the pressure above the body of liquid 24 in the compartment 10 of the control chamber 5 can be varied by an electric motor (53) and that the controls (including the master switch 60) for this motor can be readily designed in a manner to distinguish or to be readily distinguishable from the actuating means 70 for the flushing tank or container 1. This greatly reduces the likelihood of confusion and ensures that the user of the toilet can actuate the parts 60 and 70 in proper sequence. Moreover, the improved apparatus employs a minimum of movable parts so that the wear is negligible and the apparatus can stand long periods of uninterrupted use without much attention. This is in contrast to conventional regulating apparatus which employ numerous mobile mechanical components. The improved apparatus employs fewer seals and fewer levers, links and similar parts than heretofore known regulating apparatus.

It is also within the purview of the invention to provide a separate conduit or housing for the pressure generating device 52 and motor 53. However, installation of such parts in the conduit 14 is preferred at this time because it contributes to compactness and lower cost of the regulating apparatus. Moreover, the motor 53 can cause the pressure generating device 52 to automatically compel the foul smelling gases to propagate themselves from the interior of the bowl 74 into the conduit 16 and thence into the drain pipe 99 so that such gases cannot spread in the room which accommodates the bowl 74.

It will be readily appreciated that the likelihood of operating the master switch 60 and actuating knob 70 in improper sequence can be greatly reduced if such parts are installed at spaced-apart locations, for example one of them on the housing of the container or tank 1 and the other on the support or floor 77 for the toilet bowl 74.

The evacuating means 18 of FIG. 1 constitutes a simple but efficient device for hydrostatically connecting the interior of the control chamber 5 with the interior of the container 1 so as to allow for gravitational evacuation of the body of sealing liquid 24 into the container in response to closing of the master switch 60. As mentioned above, a small quantity 72 of liquid 24 can remain in order to prevent spreading of foul smelling gases from the interior of the compartment 10 and/or 11 into the interior of the container 1. This siphon or evacuating means 19, 33 does not require any moving parts so that its integrity remains intact for long periods of time.

The adjustable composite overflow pipe 40, 44 of FIG. 1 ensures that delayed starting of the pressure generating device 52 does not permit the development of required gas pressure above the body of liquid in the compartment 10 of the control chamber 5. This, in turn, ensures that foul smelling gases cannot flow between the conduits 14 and 16 in either direction prior to filling of the control chamber 5 to the maximum level 23 or at least to a level such as to prevent direct flow of gases between the inlet 15 and outlet 17 or vice versa. In the absence of such design, it would be necessary to continuously operate the pressure generating device 52 which would result in continuous evacuation of normally heated air from the room which accommodates the toilet bowl 74 and would thus entail considerable losses of energy for heating. If the pressure generating device 52 were arrested while the conduits 14 and 16 are free to communicate with each other, foul smelling gases from the drain pipe 99 could flow into the conduit 14 and thence into the interior of the bowl 74 to fill the room in which the bowl is installed.

The control chamber 5 which has a cross-sectional outline as shown in FIG. 4 or 9 exhibits the advantage that the minimum quantity 72 of liquid 24 automatically accumulates in its lower portion in response to each interruption of the liquid column in the pipe 19.

If the overflow pipe 40, 44 is also surrounded by a tubular envelope analogous to the envelope 33 shown in FIG. 1, this invariably ensures that no foul smelling gases can escape from the control chamber 5 into the container 1, even during the short period of refilling of the control chamber 5 with liquid 24. The part 29 of FIG. 5 can be said to constitute an envelope for the overflow pipe 40.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A method of regulating the flow of at least one gas stream through a control chamber which has an inlet for admission of the at least one stream and a stream-discharging outlet, comprising the steps of dividing the interior of the chamber into a first compartment in communication with the inlet and a second compartment in communication with the outlet; admitting into the chamber a body of a sealing liquid which fills or can fill the chamber to a predetermined level such that the admitted liquid seals the inlet from the outlet; establishing between the first and second compartments a passage wich is located below said level; applying to the body of liquid a pressure to alter at least a portion of said level and to thereby establish communication between the inlet and the outlet, said pressure applying step including lowering the level of sealing liquid in the first compartment so that the at least one stream of gas can flow from the first to the second compartment by way of the passage; combining the chamber with a container, such as the flushing tank of a toilet; and establishing a hydrostatic connection between the second compartment and the interior of the container in response to said lowering step and the resulting raising of liquid level in the second compartment so that sealing liquid flows from the second compartment into the interior of the container.

2. The method of claim 1, wherein said pressure applying step includes admitting into the chamber a pressurized gas by way of the inlet.

3. The method of claim 1, wherein said pressure applying step includes raising the pressure of the at least one stream of gas.

4. Apparatus for regulating the flow of at least one gas stream, comprising a control chamber having a gas-admitting inlet and a gas-discharging outlet; means for supplying into said chamber a body of sealing liquid so that the liquid fills the chamber at most up to a predetermined level below said inlet and said outlet; means for establishing at least one passage for the flow of gas from said inlet to said outlet in response to a lowering of the liquid level in a portion at least of said chamber, including a partition which divides the interior of said chamber into a first compartment in communication with said inlet and a second compartment in communication with said outlet, said compartments communicating with each other by way of said passage in response to lowering of the liquid level in said first compartment; means for raising the pressure in said chamber in the region above said level so as to render the passage accessible to the at least one gas stream by lowering the liquid level in said portion of said chamber; and means for evacuating sealing liquid from said chamber in response to raising of the pressure in said chamber in the region above said predetermined level, said evacuating means having an intake which is located below said predetermined level when said pressure raising means is idle and which is located below said outlet, said pressure raising means including means for raising the pressure in said first compartment in the region above said predetermined level so that the liquid in said second compartment rises and enters said evacuating means.

5. The apparatus of claim 4, further comprising a gas-admitting conduit connected to the inlet of said chamber, said pressure raising means including said conduit.

6. The apparatus of claim 4, wherein said passage includes a portion disposed at a level above the intake of said evacuating means.

7. The apparatus of claim 4, further comprising a container associated with said chamber, said evacuating means having means for discharging into said container sealing liquid which enters said intake, said discharging means being located at a level below said intake.

8. The apparatus of claim 7, wherein said evacuating means comprises a siphon including a substantially upright pipe and an envelope surrounding said pipe and having a closed end above said pipe, said envelope and said pipe defining a space in communication with said second compartment.

9. The apparatus of claim 8, wherein said chamber has a bottom wall and said envelope has a portion resting on said bottom wall and defining at least one path for the flow of sealing liquid between said second compartment and said space.

10. The apparatus of claim 8, wherein said pipe has an open upper end at a level which coincides with or is above said predetermined level.

11. The apparatus of claim 10, wherein said pipe has an open lower end arranged to admit sealing liquid into said container, said container being arranged to confine a supply of liquid and further comprising means for maintaining the supply of liquid in said container at or below a preselected level and below the lower end of said pipe.

12. The apparatus of claim 4, further comprising a gas-admitting conduit having a lower end connected with said inlet.

13. The apparatus of claim 4, further comprising a gas-admitting conduit having an upper end connected to said inlet.

14. The apparatus of claim 4, further comprising a gas-discharging conduit having a lower end connected to said outlet.

15. The apparatus of claim 4, further comprising a gas-discharging conduit having an upper end connected to said outlet.

16. The apparatus of claim 4, wherein said pressure raising means comprises a gas-admitting conduit connected to said inlet and a pressure generating device in said conduit.

17. The apparatus of claim 16, wherein said pressure generating device includes a blower.

18. The apparatus of claim 16, further comprising motor means for said pressure generating device.

19. The apparatus of claim 18, wherein said motor means comprises an electric motor.

20. The apparatus of claim 19, further comprising circuit means for supplying energy to said motor.

21. The apparatus of claim 20, wherein said circuit means includes an interrupter switch.

22. The apparatus of claim 20, wherein said circuit means includes a master switch.

23. The apparatus of claim 22, wherein said master switch is normally open and said circuit means further comprises means for driving said motor and said pressure generating device at a plurality of different speeds in response to closing of said master switch.

24. The apparatus of claim 20, wherein said motor includes two windings.

25. The apparatus of claim 20, wherein said circuit means includes a source of electrical energy.

26. The apparatus of claim 20, wherein said motor is an a-c motor.

27. The apparatus of claim 20, wherein said motor is an a-c motor and said circuit means includes a source of a-c current for said motor.

28. The apparatus of claim 4, further comprising a source of sealing liquid connected with said supplying means.

29. The apparatus of claim 28, further comprising float-operated valve means in said supplying means.

30. The apparatus of claim 4, wherein said chamber has a substantially circular cross-sectional outline in a vertical plane.

31. The apparatus of claim 4, wherein said chamber has a substantially polygonal cross-sectional outline in a vertical plane.

32. The apparatus of claim 4, wherein said pressure raising means includes a pressure generating device, an electric motor for said pressure generating device and a master switch in circuit with said motor.

33. The apparatus of claim 32, further comprising a toilet bowl and a flushing tank for said bowl, said chamber being disposed in said tank and said bowl having a lower portion, said switch being disposed in the region of the lower portion of said bowl.

34. The apparatus of claim 32, further comprising a toilet bowl, a flushing tank for said bowl and a support for said bowl, said chamber being disposed in said tank and said switch being mounted on or close to said support.

35. The apparatus of claim 4, further comprising a toilet bowl, a flushing tank for said bowl, conduit means connecting said bowl with said inlet, a drain pipe for evacuation of the contents of said bowl, and conduit means connecting said outlet with said drain pipe.

36. The apparatus of claim 4, further comprising a toilet flushing tank, at least a portion of said chamber being installed in said tank.

37. The apparatus of claim 4, further comprising a liquid reservoir disposed in said chamber beneath said predetermined level and arranged to admit into said chamber a predetermined quantity of sealing liquid upon completed evacuation of liquid from said chamber by said evacuating means.

38. The apparatus of claim 37, wherein said reservoir includes a vessel having an inlet opening and an outlet opening beneath said inlet opening.

39. The apparatus of claim 38, wherein the cross-sectional area of said inlet opening exceeds the cross-sectional area of said outlet opening.

40. The apparatus of claim 4, further comprising a toilet bowl, a flushing tank for said bowl, first conduit means connecting said tank with said bowl, and second conduit means connecting said first conduit means with the inlet of said chamber.

41. Apparatus for regulating the flow of at least one gas stream, comprising a control chamber having a gas-admitting inlet and a gas-discharging outlet; means for supplying into said chamber a body of sealing liquid so that the liquid fills the chamber at most up to a predetermined level below said inlet and said outlet; means for establishing at least one passage for the flow of gas from said inlet to said outlet in response to a lowering of the liquid level in a portion at least of said chamber; means for raising the pressure in said chamber in the region above said level so as to render the passage accessible to the at least one stream by lowering the liquid level in said portion of said chamber, including a gas-admitting conduit connected to said inlet, a pressure generating device in said conduit, an electric motor for said pressure generating device, and circuit means for supplying energy to said motor, said circuit means including a float-operated interrupter-switch; and means for evacuating sealing liquid from said chamber in response to raising of the pressure in said chamber in the region above said predetermined level, said evacuating means having an intake which is located above said predetermined level when said pressure raising means is idle and which is located below said outlet.

42. Apparatus for regulating the flow of at least one gas stream, comprising a control chamber having a gas-admitting inlet and a gas-discharging outlet; means for supplying into said chamber a body of sealing liquid so that the liquid fills the chamber at most up to a predetermined level below said inlet and said outlet; means for establishing at least one passage for the flow of gas from said inlet to said outlet in response to a lowering of the liquid level in a portion at least of said chamber; means for raising the pressure in said chamber in the region above said level so as to render the passage accessible to the at least one stream by lowering the liquid level in said portion of said chamber, including a gas-admitting conduit connected to said inlet, a pressure generating device in said conduit, an electric motor for said pressure generating device, circuit means for supplying energy to said motor, said circuit means including an interrupter switch, and means for opening said switch including a float in said chamber, said float being arranged to open said switch and to thus arrest said motor when the supply of sealing liquid in said chamber rises to said predetermined level; and means for evacuating sealing liquid from said chamber in response to raising of the pressure in said chamber in the region above said predetermined level, said evacuating means having an intake which is located above said predetermined level when said pressure raising means is idle and which is located below said outlet.

43. Apparatus for regulating the flow of at least one gas stream, comprising a control chamber having a gas-admitting inlet and a gas-discharging outlet; means for supplying into said chamber a body of sealing liquid so that the liquid fills the chamber at most up to a predetermined level below said inlet and said outlet; means for establishing at least one passage for the flow of gas from said inlet to said outlet in response to a lowering of the liquid level in a portion at least of said chamber; means for raising the pressure in said chamber in the region above said level so as to render the passage accessible to the at least one gas stream by lowering the liquid level in said portion of said chamber; means for evacuating sealing liquid from said chamber in response to raising of the pressure in said chamber in the region above said predetermined level, said evacuating means having an intake which is located below said predetermined level when said pressure raising means is idle and which is located below said outlet; a container connected with said chamber; and means for conveying sealing liquid from said chamber into said container, said conveying means having an open upper end at said predetermined level.

44. The apparatus of claim 43, wherein said conveying means comprises a substantially upright pipe having an open lower end in said container.

45. The apparatus of claim 44, wherein said pipe comprises means for varying the distance between its open ends.

46. The apparatus of claim 45, wherein said pipe includes a first portion which defines said upper end and a second portion which defines said lower end, one of said portions being telescoped into the other of said portions.

47. The apparatus of claim 46, wherein said second portion is movable up and down relative to said first portion between a plurality of different positions in each of which said lower end is located at a different distance from said upper end.

48. The apparatus of claim 47, wherein said first portion includes a nut having internal threads and said second portion has external threads mating with the threads of said nut.

49. The apparatus of claim 48, further comprising sealing means interposed between said first and second portions.

50. The apparatus of claim 49, further comprising means for deforming said sealing means in response to the application of said nut.

51. Apparatus for regulating the flow of at least one gas stream, comprising a control chamber having a gas-admitting inlet and a gas-discharging outlet; means for supplying into said chamber a body of sealing liquid so that the liquid fills the chamber at most up to a predetermined level below said inlet and said outlet; a source of sealing liquid connected with said supplying means; means for establishing at least one passage for the flow of gas from said inlet to said outlet in response to a lowering of the liquid level in a portion at least of said chamber; means for raising the pressure in said chamber in the region above said level so as to render the passage accessible to the at least one gas stream by lowering the liquid level in said portion of said chamber; means for evacuating sealing liquid from said chamber in response to raising of the pressure in said chamber in the region above said predetermined level, said evacuating means having an intake which is located below said predetermined level when said pressure raising means is idle and which is located below said outlet; a container for said chamber, said evacuating means being arranged to admit sealing liquid from said chamber into said container; valve means provided in said supplying means; and means for closing said valve means when the supply of sealing liquid in said container rises to a preselected level, said closing means including a float in said container.

52. Apparatus for regulating the flow of at least one gas stream, comprising a control chamber having a gas-admitting inlet and a gas-discharging outlet; means for supplying into said chamber a body of sealing liquid so that the liquid fills the chamber at most up to a predetermined level below said inlet and said outlet; means for establishing at least one passage for the flow of gas from said inlet to said outlet in response to a lowering of the liquid level in a portion at least of said chamber; means for raising the pressure in said chamber in the region above said level so as to render the passage accessible to the at least one gas stream by lowering the liquid level in said portion of said chamber; and means for evacuating sealing liquid from said chamber in response to raising of the pressure in said chamber in the region above said predetermined level, said evacuating means having an intake which is located below said predetermined level when said pressure raising means is idle and which is located below said outlet, said evacuating means including a siphon including a substantially upright pipe having an open upper end and an open lower end and an envelope surrounding said pipe and defining therewith a space in communication with the interior of said chamber, said envelope having a closed upper end above the upper end of said pipe and said intake being defined by said envelope at a level between the upper and lower ends of said pipe, said chamber having a bottom wall provided with a recess and said intake being disposed in said recess.

53. Apparatus for regulating the flow of at least one gas stream, comprising a control chamber having a gas-admitting inlet and a gas-discharging outlet; means for supplying into said chamber a body of sealing liquid so that the liquid fills the chamber at most up to a predetermined level below said inlet and said outlet; means for establishing at least one passage for the flow of gas from said inlet to said outlet in response to a lowering of the liquid level in a portion at least of said chamber; means for raising the pressure in said chamber in the region above said level so as to render the passage accessible to the at least one gas stream by lowering the liquid level in said portion of said chamber, including a pressure generating device, an electric motor for said pressure generating device, and a master switch in circuit with said motor; means for evacuating sealing liquid from said chamber in response to raising of the pressure in said chamber in the region above said predetermined level, said evacuating means having an intake which is located below said predetermined level when said pressure raising means is idle and which is located below said outlet; and a toilet bowl having a seat and a flushing tank for said bowl, said chamber being connected with said tank and said master switch being disposed in the region of said seat.

54. Apparatus for regulating the flow of at least one gas stream, comprising a control chamber having a gas-admitting inlet and a gas-discharging outlet; means for supplying into said chamber a body of sealing liquid so that the liquid fills the chamber at most up to a predetermined level below said inlet and said outlet; means for establishing at least one passage for the flow of gas from said inlet to said outlet in response to a lowering of the liquid level in a portion at least of said chamber; means for raising the pressure in said chamber in the region above said level so as to render the passage accessible to the at least one gas stream by lowering the liquid level in said portion of said chamber; means for evacuating sealing liquid from said chamber in response to raising of the pressure in said chamber in the region above said predetermined level, said evacuating means having an intake which is located below said predetermined level when said pressure raising means is idle and which is located below said outlet; a container for said chamber, said evacuating means being arranged to admit sealing liquid into said container; means for conveying sealing liquid from said chamber into said container independently of said evacuating means, including an overflow pipe having an open upper end located in said chamber at said predetermined level and an outlet for admission of liquid into said container; and a tubular envelope surrounding said pipe in said chamber and defining therewith a path for the flow of sealing liquid from said chamber into said pipe when the sealing liquid in said chamber rises above said predetermined level.

55. Apparatus for regulating the flow of at least one gas stream, comprising a control chamber having a gas-admitting inlet and a gas-discharging outlet; means for supplying into said chamber a body of sealing liquid so that the liquid fills the chamber at most up to a predetermined level below said inlet and said outlet; means for establishing at least one passage for the flow of gas from said inlet to said outlet in response to a lowering of the liquid level in a portion at least of said chamber; means for raising the pressure in said chamber in the region above said level so as to render the passage accessible to the at least one gas stream by lowering the liquid level in said portion of said chamber; means for evacuating sealing liquid from said chamber in response to raising of the pressure in said chamber in the region above said predetermined level, said evacuating means having an intake which is located below said predetermined level when said pressure raising means is idle and which is located below said outlet; a container for said chamber, said evacuating means being arranged to admit sealing liquid into said container; and means for conveying sealing liquid from said container when the supply of liquid in said container reaches a preselected level.

56. The apparatus of claim 55, wherein said conveying means includes a main overflow pipe having an open upper end disposed in said container at said preselected level.

57. The apparatus of claim 55, further comprising a liquid-filled vessel in said container, said conveying means having an outlet in said vessel.

58. The apparatus of claim 55, further comprising a gas-admitting conduit connected with the inlet of said chamber and with said conveying means.

59. The apparatus of claim 55, further comprising a gas-discharging conduit connected with the outlet of said chamber and with said conveying means.

60. Apparatus for regulating the flow of at least one gas stream, comprising a control chamber having a gas-admitting inlet and a gas-discharging outlet; means for supplying into said chamber a body of sealing liquid so that the liquid fills the chamber at most up to a predetermined level below said inlet and said outlet; means for establishing at least one passage for the flow of gas from said inlet to said outlet in response to a lowering of the liquid level in a portion at least of said chamber; means for raising the pressure in said chamber in the region above said level so as to render the passage accessible to the at least one stream by lowering the liquid level in said portion of said chamber; means for evacuating sealing liquid from said chamber in response to raising of the pressure in said chamber in the region above said predetermined level, said evacuating means having an intake which is located below said predetermined level when said pressure raising means is idle and which is located below said outlet; a container connected with said chamber, said evacuating means being arranged to admit sealing liquid into said container; and an overflow pipe arranged to admit liquid from said chamber into said container, said pipe having an open upper end at said predetermined level and an open lower end in said container, said container having a bottom wall and a liquid-filled vessel in the region of said bottom wall, the lower end of said pipe being disposed in said vessel.

61. Apparatus for regulating the flow of at least one gas stream, comprising a control chamber having a gas-admitting inlet and a gas-discharging outlet; means for supplying into said chamber a body of sealing liquid so that the liquid fills the chamber at most up to a predetermined level below said inlet and said outlet; means for establishing at least one passage for the flow of gas from said inlet to said outlet in response to a lowering of the liquid level in a portion at least of said chamber; means for raising the pressure in said chamber in the region above said level so as to render the passage accessible to the at least one stream by lowering the liquid level in said portion of said chamber, including a pressure generating device and electric motor means for said device; means for evacuating sealing liquid from said chamber in response to raising of the pressure in said chamber in the region above said predetermined level, said evacuating means having an intake which is located below said predetermined level when said pressure raising means is idle and which is located below said outlet; a container for said chamber, said evacuating means being arranged to admit sealing liquid into said container; and means for arresting said motor means when the supply of liquid in said container rises to a preselected level.

62. The apparatus of claim 61, wherein said arresting means includes a switch in circuit with said motor means and a float installed in said container and arranged to open said switch when the supply of liquid in said container rises to said preselected level.

63. Apparatus for regulating the flow of at least one gas stream, comprising a control chamber having a gas-admitting inlet and a gas-discharging outlet; means for supplying into said chamber a body of sealing liquid so that the liquid fills the chamber at most up to a predetermined level below said inlet and said outlet; means for establishing at least one passage for the flow of gas from said inlet to said outlet in response to a lowering of the liquid level in a portion at least of said chamber; means for raising the pressure in said chamber in the region of above said level so as to render the passage accessible to the at least one gas stream by lowering the liquid level in said portion of said chamber; and means for evacuating sealing liquid from said chamber in response to raising of the pressure in said chamber in the region above said predetermined level, said evacuating means having an intake which is located below said predetermined level when said pressure raising means is idle and which is located below said outlet, said evacuating means comprising an overflow pipe having an open end constituting said intake and located beneath said predetermined level, said pipe further having a portion disposed downstream of said intake and located at or close to said predetermined level.

64. The apparatus of claim 63, wherein said chamber has a bottom wall and said intake is located in the region of said bottom wall, said pipe having a substantially S-shaped outline.

* * * * *